US006037994A

United States Patent [19]
Bae

[11] Patent Number: 6,037,994
[45] Date of Patent: Mar. 14, 2000

[54] SYNC SIGNAL PROCESSING DEVICE FOR COMBINED VIDEO APPLIANCE

[75] Inventor: Sang Geun Bae, Kyoungsangbuk-Do, Rep. of Korea

[73] Assignee: LG Electronics, Inc., Seoul, Rep. of Korea

[21] Appl. No.: 08/827,992

[22] Filed: May 9, 1997

[51] Int. Cl.$^7$ ........................................ H04N 5/04
[52] U.S. Cl. .................... 348/510; 348/500; 348/525; 348/521; 348/516; 348/542; 348/554; 345/213
[58] Field of Search ........................ 348/510, 500, 348/525, 521, 524, 516, 522, 552, 529, 530, 542, 543, 544, 554, 555, 558; 345/213, 204; H04N 5/04, 5/05

[56] References Cited

U.S. PATENT DOCUMENTS

| | | | |
|---|---|---|---|
| 4,425,581 | 1/1984 | Schweppe et al. | 348/510 |
| 4,464,679 | 8/1984 | Wargo | 348/510 |
| 4,554,582 | 11/1985 | Wine | 348/510 |
| 4,631,585 | 12/1986 | Wine | 348/510 |
| 4,670,774 | 6/1987 | Tokui | 348/505 |
| 4,670,785 | 6/1987 | Medin | 348/510 |
| 4,684,987 | 8/1987 | Tsutsui | 348/543 |
| 4,896,214 | 1/1990 | Dieterle et al. | 348/510 |
| 5,068,732 | 11/1991 | Satoh | 348/748 |
| 5,394,171 | 2/1995 | Rabii | 345/213 |
| 5,469,220 | 11/1995 | Kumada | 348/529 |
| 5,486,869 | 1/1996 | Cooper | 348/525 |
| 5,502,503 | 3/1996 | Koz | 348/552 |
| 5,526,055 | 6/1996 | Zhang et al. | 348/510 |
| 5,550,594 | 8/1996 | Cooper et al. | 348/513 |
| 5,610,663 | 3/1997 | Nan et al. | 348/554 |
| 5,754,250 | 5/1998 | Cooper | 348/525 |
| 5,808,692 | 9/1998 | Lee | 348/542 |
| 5,812,204 | 9/1998 | Baker et al. | 348/453 |

*Primary Examiner*—John K. Peng
*Assistant Examiner*—Jean W. Désir
*Attorney, Agent, or Firm*—Fish & Richardson P.C.

[57] ABSTRACT

A sync signal processing device for a combined video appliance capable of directly processing a personal computer (PC) signal through a television (TV) receiver circuit to achieve the horizontal and vertical driving and deflection. The device can prevent the vertical trembling phenomena of the displayed picture and on-screen display by compensating for the sync frequency difference between the PC signal and the TV signal. According to the devices either a TV sync signal or a PC sync signal is selected in accordance with a selected TV/PC mode after the PC sync signal is frequency-converted and the selected PC sync signal is processed through the TV sync signal processing circuit. Either the horizontal driving pulse signal form the TV sync signal processing circuit or the horizontal driving pulse signal produced from a separate horizontal oscillation circuit is selected and outputted to a horizontal output circuit in accordance with the selected TV/PC mode.

3 Claims, 3 Drawing Sheets

SYNC SIGNAL PROCESSING DEVICE FOR COMBINED VIDEO APPLIANCE

BACKGROUND OF THE INVENTION

1. Field of the Invention

The present invention relates to a sync signal processing device for a combined video appliance. In particular, the present invention relates toga sync signal processing device for a television (TV) receiver combined with a personal computer (PC) which can directly process a PC sync signal through a sync signal processing circuit of the TV receiver to achieve horizontal and vertical driving and deflection.

2. Description of the Prior Art

Recently, as a TV receiver combined with a PC is being introduced, techniques for displaying a PC signal on a screen of a TV receiver by processing the PC signal through internal circuits of the TV receiver have been developed.

A conventional sync signal processing device of a TV receiver is illustrated in FIG. 1. Referring to FIG. 1, the conventional device includes a video processing section 1 for processing a received TV video signal and separating horizontal and vertical sync signal from the video signal, a sync signal processing circuit 2 for producing horizontal and vertical driving signals in accordance with the horizontal and vertical sync signals separated through the video processing section 1, a horizontal output circuit 3 for performing a horizontal deflection in accordance with the horizontal driving signal outputted from the sync signal processing circuit 2, a vertical output circuit 4 for performing a vertical deflection in accordance with the vertical driving signal outputted from the sync signal processing circuit 2, and a microcomputer 5 for controlling the operation of the sync signal processing circuit 2.

According to the conventional sync signal processing device of the TV receiver as constructed above, the TV video signal processed by the video processing section I is inputted to the sync signal processing circuit 2. In the sync signal processing circuit 2, the horizontal and vertical sync signals are separated from the TV video signal, and the horizontal and vertical driving signals HD and VD are produced in accordance with the separated horizontal and vertical sync signals to be inputted to the horizontal and vertical output circuits, respectively.

At this time, the microcomputer 5 varies correction data of the sync signal processing circuit 2 to control the correction of the picture displayed on the screen, and the horizontal and vertical output circuits 3 and 4 perform the horizontal and vertical outputs (deflections) in accordance with the input horizontal and vertical driving signals, respectively.

The sync signal process performed by the sync signal processing circuit 2 will now be explained in detail.

The sync signal processing circuit 2 is provided with a horizontal sync separating section 6 for separating the horizontal sync signal Hsync inputted from the video processing section 1, a horizontal locking section 7 for locking the horizontal sync signal outputted from the horizontal sync separating section 5 into a horizontal blanking section 8 for processing a horizontal blanking in compliance with a, input horizontal deflection pulse signal, a phase detecting section 9 for detecting the phase of the horizontal sync signal provided from the horizontal sync separating section 6, an oscillation section 10 for oscillating with a frequency of 503.5 KHz in accordance with the output of the phase detecting section 9, a divider 11 for dividing by 32 the output of the oscillation section 10 and providing the divided frequency to the phase detecting section 9 to achieve a phase locked loop (PLL), a phase detecting section 12 for detecting the phase of the output of the divider 11 and the output of the horizontal blanking section 9, a phase shifting section 13 for shifting the output of the phase detecting section 12, a horizontal driving section 14 for providing to the horizontal output circuit 3 the horizontal driving signal HD in accordance with the output of the phase shifting section 13, a phase detecting section 15 for detecting the phase of the output of the divider 11, an oscillation section 16 for oscillating with a frequency of 16 MHz in accordance with the output of the phase detecting section 15, and a divider 17 for dividing by 1024 the output of the oscillation section 16 and providing the divided frequency to the phase detecting section 15 to achieve a PLL.

The sync signal processing circuit 2 is also provided with a vertical sync separating section 18 for separating the vertical sync signal vsync inputted from the video processing section 1, a count-down processor 19 for performing a down-counting with respect to the vertical sync signal separated by the vertical sync separating section 18 and the output signal of the divider 17, a digital signal processor 20 for processing a digital signal for correcting the deflection in response to the output of the count-down processor 19, a vertical driving section 21 for providing the vertical driving signal VD to the vertical output circuit 4 by performing a digital-to-analog conversion of a vertical sawtooth wave, low-pass-filtering, and amplification in response to the data outputted from the digital signal processor 20, a horizontal digital-to-analog (D/A) converter 22 for converting the horizontal data outputted from the digital signal processor 20 into an analog signal, an automatic frequency control (AFC) compensation section 23 for compensating for the output of the horizontal D/A converter 22 to provide the compensated signal to the phase shifting section 13, and a bus decoder 24 for performing an I$^2$C bus decoding between the processor 19 and the microcomputer 5.

The operation of the conventional sync signal processing device as constructed above will be explained.

The horizontal sync separating section 6 separates the horizontal sync signal form the input video signal, and the horizontal locking section 7 is locked into the horizontal deflection pulse signal inputted to the horizontal blanking section 8. The horizontal blanking section 8 performs the horizontal blanking process of the inputted horizontal deflection pulse signal and provides the processed signal to the horizontal locking section 7, phase detecting section 12, and the count-down processor 19.

The phase detecting section 9 detects the phase of the horizontal sync signal separated by the horizontal sync separating section 6 and the signal obtained by dividing by 32 the oscillated signal 32 $f_H$VCO of 503.5 KHz outputted from the oscillation section 10, and controls the operation of the oscillation section 10 in accordance with the detected phase, so that an AFC loop is effected to make the oscillation section 10 produce a horizontal pulse signal synchronized with the horizontal sync signal.

The horizontal pulse signal, which is divided through the divider 11, is inputted to the phase detecting section 12. The phase of the horizontal pulse signal is compared with that of the output of the horizontal blanking section 8, and the result of the phase comparison is inputted to the phase shifting section 13 to control the phase of the horizontal driving output pulse signal. The horizontal driving section 14 outputs the horizontal driving pulse signal HD to the horizontal output circuit 3 in response to the output of the phase shifting section 13.

The horizontal pulse signal divided through the divider 11 is also inputted to the phase detecting section 15, and the phase detecting section 15 compares the phase of the output of the divider 11 with that of the signal obtained by dividing by 1024 the clock signal of 16 MHz produced from the oscillation section 16, so that the operation of the oscillation section 16 is controlled in accordance with the comparison result.

Meanwhile, the vertical sync separating section 18 separates the vertical sync signal from the input video signal and provides the separated vertical sync signal to the count-down processor 19. The count-down processor 19 counts down the vertical sync signal and the clock signal divided by and inputted from the divider 17, and provides the counted data to the digital signal processor 20 for correcting the deflection.

The digital signal processor 20 receives the counted data from the count-down processor 19 and the clock signal form the divider 17, and produces the digital data of the vertical sawtooth wave, parabolic wave, and AFC compensation including the compensation for the picture distortion. The vertical driving section 21 performs the D/A conversion of the vertical sawtooth wave, low-pass-filtering, amplification, etc., and provides the vertical driving pulse signal VD produced by the above-described signal process to the vertical output circuit 4 to effect the vertical deflection.

The horizontal D/A converter 22 converts the AFC compensation data into the analog signal and provides the analog signal to the AFC compensation section 23, so that the AFC compensation section 23 superimposes the compensation signal on the output of the phase shifting section 13 to achieve the compensation for the picture distortion.

The microcomputer 5 controls the picture correction by decoding all the compensation data SCL and SDA through the bus decoder 24.

However, the conventional sync signal processing device of the TV receiver has the drawback that it cannot process the PC signal due to the frequency difference between the PC signal and the TV signal if the PC signal is processed as it is, not being frequency-converted. Further, the picture and the on-screen display (OSD) on the screen tremble in a vertical direction since the horizontal sync signal of the PC signal is not 15.75 KHz suitable for the IV signal during the vertical oscillation process even though the PC signal is processed through separate switching sections.

SUMMARY OF THE INVENTION

It is an object of the present invention to solve the problems involved in the prior art, and to provide a sync signal processing device for a combined video appliance which can directly process a PC signal through a TV receiver circuit with the prevention of the trembling phenomena of the picture and the OSD in the vertical direction.

In order to achieve the above object, according to the present invention, one of a PC sync signal and a TV sync signal is selected after the PC sync signal is frequency-converted, and if the PC sync signal is selected, it is switched and horizontally controlled so as to correspond to the TV sync signal process.

In one aspect of the present invention, there is provided a sync signal processing device for a combined video appliances which can process both horizontal and vertical sync signals of a television (TV) and those of a personal computer (PC). The sync signal processing device includes a frequency converter for frequency-converting the PC horizontal sync signal, a horizontal driving pulse generator for generating a horizontal driving pulse signal in response to the PC horizontal sync signal, a first selector for selecting either the PC vertical sync signal and the frequency-converted horizontal sync signal or the TV vertical and horizontal sync signals in accordance with a selected TV/PC mode, a sync signal processor for producing horizontal and vertical driving pulse signals by processing the sync signals selected by the first selector, a second selector for selecting either the PC horizontal driving pulse signal or the horizontal driving pulse signal provided from the sync signal processor to output the selected signal, and a controller for controlling the first and second selectors in accordance with the selected TV/PC mode.

BRIEF DESCRIPTION OF THE DRAWINGS

The above object, other features, and advantages of the present invention will become more apparent by describing the preferred embodiment thereof with reference to the accompanying drawings, in which.

DETAILED DESCRIPTION OF THE PREFERRED EMBODIMENT

Figure 2:
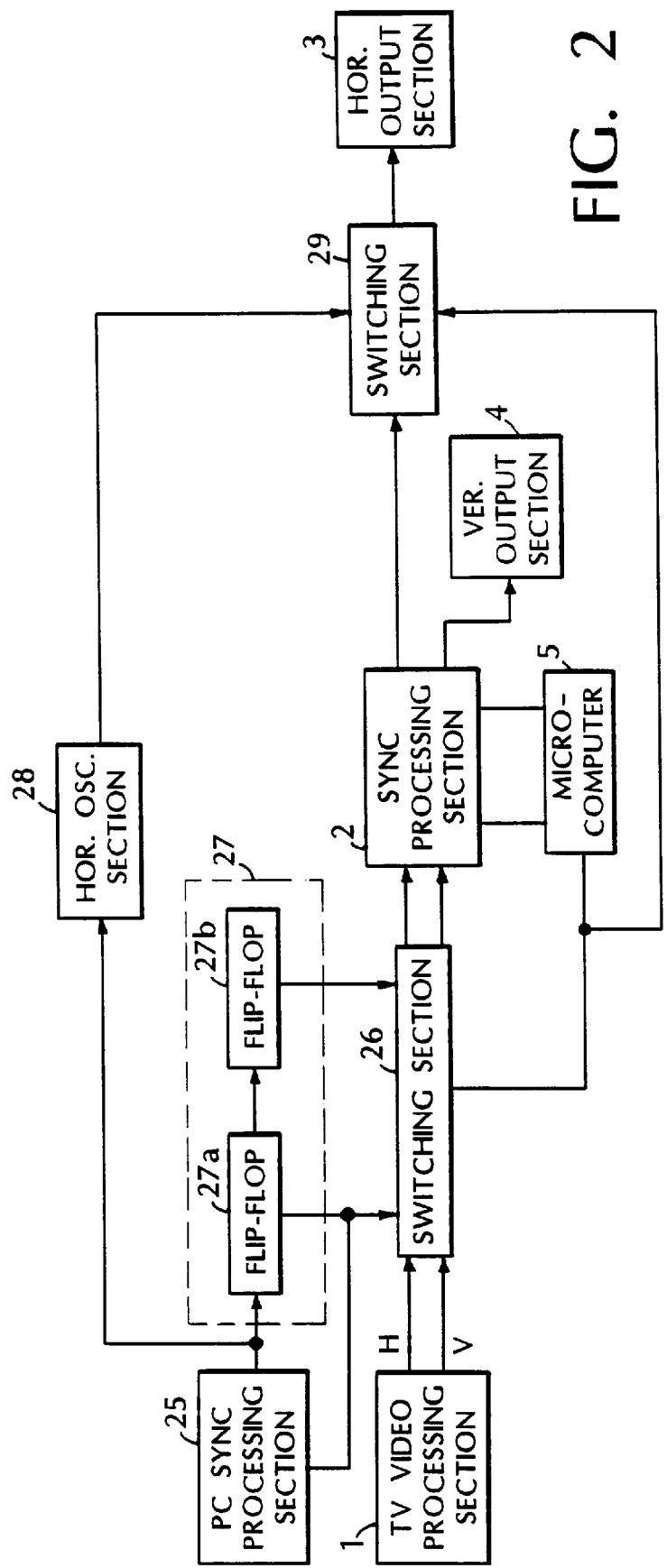
FIG. 2 is a block diagram of the sync signal processing device of the combined video appliance according to the present invention.

FIG. 2 shows the sync signal processing device of a combined video appliance according to a preferred embodiment of the present invention. In this embodiment, the combined video appliance is a television (TV) receiver combined with a personal computer (PC).

Referring to FIG. 2, the sync signal processing device according to the present invention is provided with a TV video processing section 1 for processing a TV video signal, a PC sync processing section 25 for processing PC horizontal and vertical sync signals, a frequency conversion section 27 for performing a frequency conversion of the PC horizontal sync signal outputted from the PC sync processing section 25, a switching section 26 for selecting horizontal and vertical sync signals from the TV video processing section 1 by a control signal inputted in accordance with a TV/PC mode, and a sync processing section 2 for producing horizontal and vertical driving pulse signals by processing the horizontal and vertical sync signals selected by the switching section 26.

The sync signal processing device is also provided with a horizontal oscillation section 28 for producing a horizontal driving pulse signal in response to the horizontal sync signal outputted from the PC sync processing section 25, a switching section 29 for selecting either the horizontal driving pulse signal outputted from the horizontal oscillation section 28 or the horizontal driving pulse signal outputted from the sync processing section 2, a horizontal output section 3 for performing a horizontal deflection in accordance with the horizontal driving pulse signal selected by the switching section 29, a vertical output section 4 for performing a vertical deflection in accordance with the vertical driving pulse signal outputted from the sync processing section 2, and a microcomputer 5 for performing a compensation control of the sync processing section 2, and providing control signals for switch-controlling the switching sections 26 and 29 in accordance with the TV/PC mode selected through a mode selection section (not illustrated) such as a remote controller.

The operation of the sync signal processing device according to the present invention as constructed above will now be explained.

The TV video processing section 1 processes the TV video signal, and separates the horizontal and vertical sync signals therefrom to provide: the sync signals to the switching section 26.

The PC sync processing section 25 separates the PC horizontal and vertical sync signals from a PC video signal, and provides the PC vertical sync signal to the switching section 26 while providing the PC horizontal sync signal to the frequency conversion section 27. In this exemplary embodiment, the PC horizontal sync signal is of 31.5 KHz.

Figure 3A:
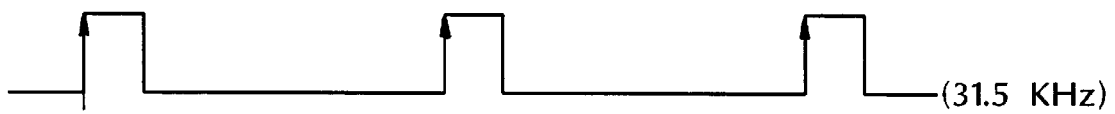
FIGS. 3A to 3C are timing diagrams illustrating the horizontal sync signal process according to the present invention.
Figure 3B:
Figure 3C:

The frequency conversion section 27 comprises a flip-flop 27a for dividing the input PC horizontal sync signal by 2, and a multivibrator 27b for receiving the output of the flip-flop 27a and mating the duty cycle of the divided sync signal with that of the PC horizontal sync signal. In operation, the input PC horizontal sync signal of 31.5 KHz as shown in FIG. 3A is inputted to the flip-flop 27a as its clock signal, and thus a divided sync signal obtained by dividing the PC horizontal sync signal by 2 as shown in FIG. 3B is outputted from the output terminal of the flip-flop 27a. The ½-divided sync signal is inputted to the multivibrator 27b and is converted into a PC horizontal sync signal of 15.75 KHz (i.e., frequency-converted signal), whose duty cycle is controlled to mate with the input PC horizontal sync signal as shown in FIG. 3C, to be outputted to the switching section 26.

The switching section 26 is switched over corresponding to the TV/PC mode under the control of the microcomputer 5. That is, in the TV mode, it is switched to the TV video processing section 1, while in the PC mode it is switched to the PC sync processing section 25 and the frequency conversion section 27.

Specifically, in the TV mode, the sync signal from the TV video processing section 1 is selected by the switching section 26 to be inputted to the sync processing section 2, while in the PC mode, the vertical sync signal from the PC sync processing section 25 and the PC horizontal sync signal from the frequency conversion section 27 are selected by the switching section 26 to be inputted to the sync processing section 2.

Figure 1:
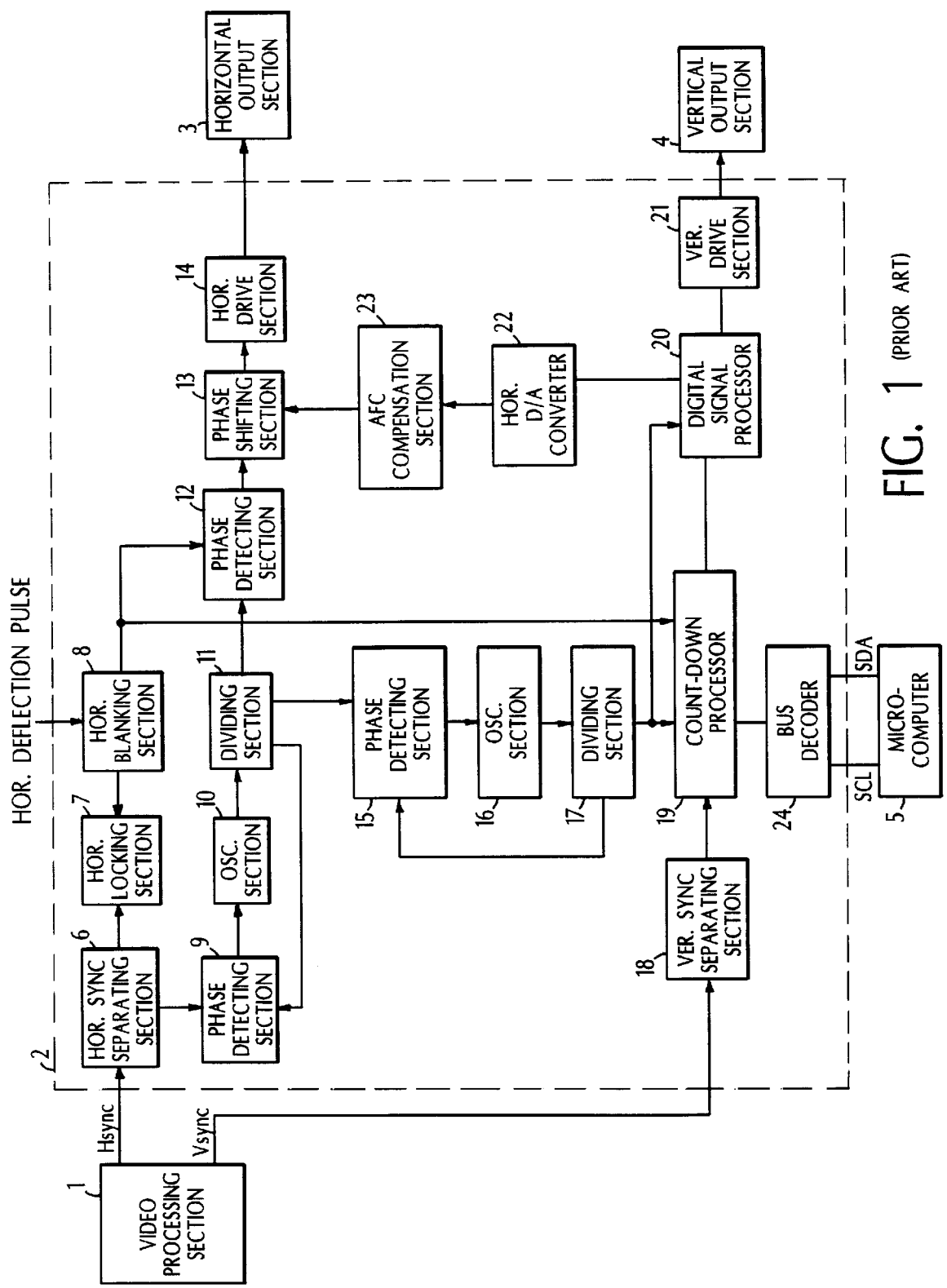
FIG. 1 is a block diagram of a conventional sync signal processing device of a TV receiver.

In the embodiment of FIG. 2, the sync processing section 2 has the same construction and function as the conventional one in FIG. 1, and produced the horizontal and vertical driving pulse signals by processing the horizontal and vertical sync signals selected by the switching section 26. The horizontal driving pulse signal outputted from the sync processing section 2 is inputted to the switching section 29.

Meanwhile, the horizontal sync signal of 31.5 KHz outputted from the PC sync processing section 25 is inputted to the horizontal oscillation section 28, causing the horizontal oscillation section 28 a to perform the horizontal oscillation, and thus the horizontal driving pulse signal is outputted from the horizontal oscillation section 28 to the switching section 29.

The switching section 29 is switched over by the control signal outputted from the microcomputer 5 in accordance with the selected TV/PC mode. In the TV mode, it is switched to the sync processing section 2, while in the PC mode, it is switched to the horizontal oscillation section 28.

Specifically, in the TV mode, the TV horizontal and vertical sync signals are selected by the switching section 26 and then processed through the sync processing section 2, resulting in that the vertical driving pulse signal is outputted from the sync processing section 2 to the vertical output section 4. Accordingly, the horizontal and vertical deflections are performed in accordance with the TV horizontal and vertical sync signals.

In the PC mode, the horizontal driving pulse signal produced by the PC horizontal sync signal is selected by the switching section 29 and then provided to the horizontal output section 3, while the PC vertical sync signal and the frequency-converted PC horizontal sync signal which are selected by the switching section 26 are inputted to and processed by the sync processing section 2. At this time, the vertical driving pulse signal produced by the vertical sync signal is provided to the vertical output section 4. As a result, in this mode, the horizontal deflection is performed in accordance with the PC horizontal sync signal and the vertical deflection is performed in accordance with the PC vertical sync signal.

As described above, the sync signal processing device of a combined video appliance according to the present invention provides the advantages that it can prevent the vertical trembling phenomena of the picture and the OSD and provides a stable picture by using the typical TV sync processing circuit in a TV mode, and by processing the horizontal sync signal by a separate horizontal oscillation circuit while processing the vertical sync signal by the typical TV sync processing circuit in a PC mode.

While the present invention has been described and illustrated herein with reference to the preferred embodiment thereof, it will be understood by those skilled in the art that various changes in form and details may be made therein without departing from the spirit and scope of the invention.

What is claimed is:

1. A sync signal processing device for a combined video appliance for processing both horizontal and vertical sync signals of a television (TV) and those of a personal computer (PC), comprising:

a horizontal oscillator for generating a horizontal driving pulse signal in response to said PC horizontal sync signal;

a frequency converter for converting a frequency of said PC horizontal sync signal into a frequency of said TV horizontal sync signal;

a first selector for selecting either said PC vertical sync signal and said frequency-converted horizontal sync signal or said TV vertical and horizontal synch signals in accordance with a selected TV/PC mode;

a sync signal processor for converting said TV or PC sync signals into vertical and horizontal driving pulse signals according to a selected state of said first selector, said PC sync signals comprising a PC vertical sync signal and said frequency-converted PC horizontal sync signal;

a second selector for selecting either an output signal of said horizontal oscillator or an output signal of said sync signal processor to output a selected signal; and a controller for controlling said first and second selectors in accordance with said mode selector for selecting said TV/PC mode.

2. A sync signal processing device as claimed in claim 1, further comprising a mode selector for selecting said TV/PC mode.

3. A sync signal processing device as claimed in claim 1, wherein said frequency converter comprises:

a flip-flop for dividing by 2 said input PC horizontal sync signal; and a multivibrator for receiving an output of said flip-flop and mating a duty cycle of said divided sync signal with that of said PC horizontal sync signal.

* * * * *